Dec. 26, 1950
P. E. MILTON
2,535,222
SEED EJECTOR FOR ROTARY TRAPCHAMBER
TYPE SEED PLANTERS
Filed May 5, 1947
2 Sheets-Sheet 1
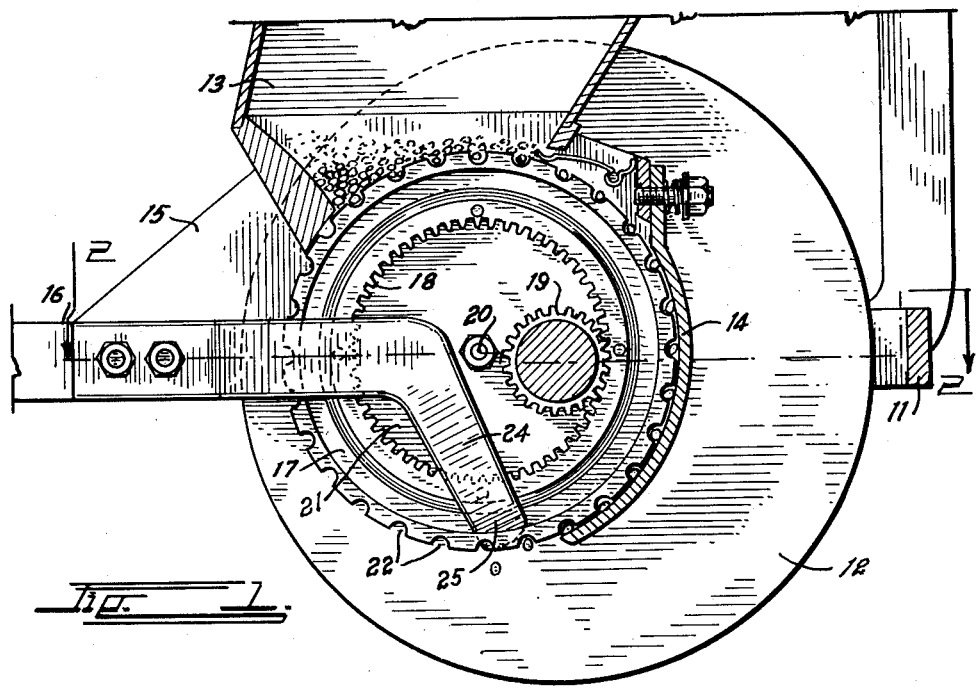
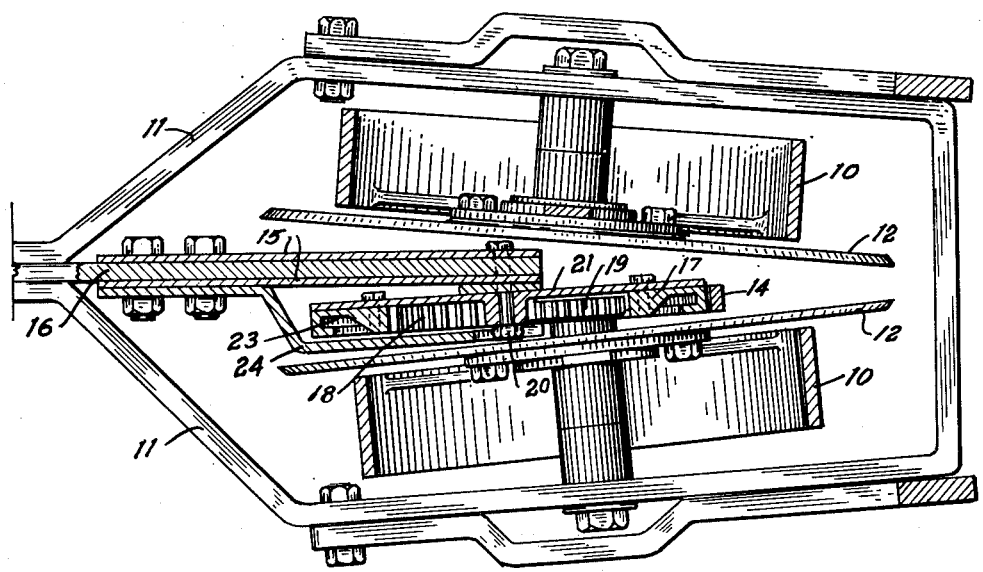
INVENTOR.
PAUL E. MILTON.
BY
ATTORNEY.

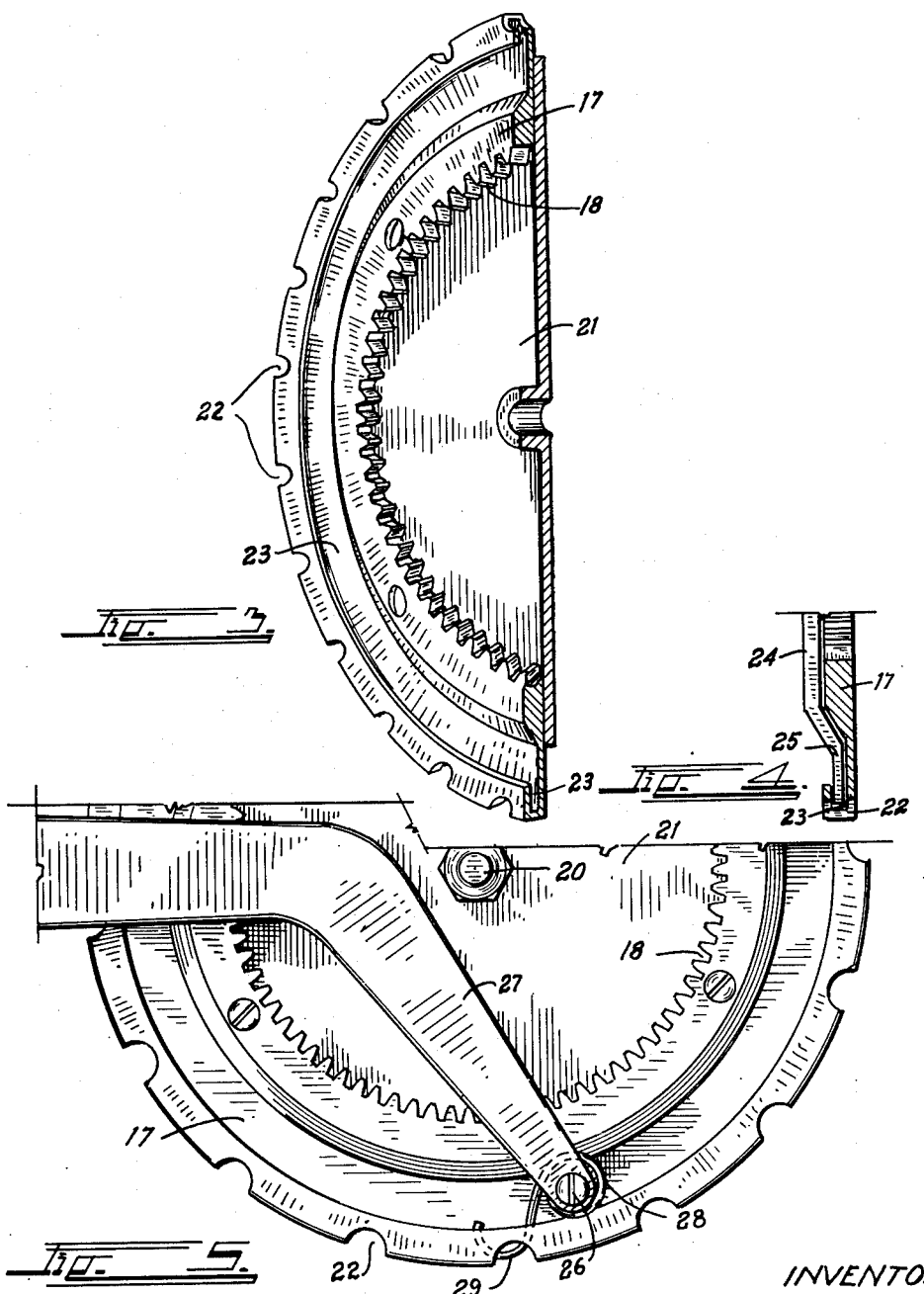

Patented Dec. 26, 1950

2,535,222

UNITED STATES PATENT OFFICE 2,535,222

SEED EJECTOR FOR ROTARY TRAP CHAMBER TYPE SEED PLANTERS

Paul E. Milton, Johnstown, Colo.

Application May 5, 1947, Serial No. 745,987

2 Claims. (Cl. 222—218)

This invention relates to a seed planter and more particularly of the type shown in applicant's Patent No. 2,496,885.

It has been found exceedingly difficult to handle certain types of seeds with the conventional seed drills and planters. This is more particularly true with sugar-beet seeds, due to their rough irregular shapes and sizes.

The principal object of this invention is to provide a mechanism, which will positively eject the seeds from the planter regardless of their shape and size and regardless of their being wedged in the seed wheel thus insuring accurate seed spacing.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is the longitudinal section through a portion of a seed planter of the type illustrated in applicant's said patent showing the invention in place thereon;

Fig. 2 is a horizontal section through the planter taken on the line 2—2 of Fig. 1;

Fig. 3 is an enlarged detail perspective view, partially in section, of a seed wheel used in this invention;

Fig. 4 is an enlarged detail section through the edge of the seed wheel of Fig. 3 illustrating the position of a seed ejecting shoe thereon; and Fig. 5 is a fragmentary detail view illustrating an alternate form of seed ejector.

The invention is applicable to any type of planter employing a seed carrying wheel. A planter of this type is illustrated in the drawing with its various parts indicated by numeral as follows: ground engaging wheels 10, carrying frame 11, furrow disc 12, seed hopper 13, seed retaining shoe 14, hopper supporting brackets 15, seed wheel supporting arm 16.

The seeds are carried from the hopper 13 by means of an annular seed wheel having internal teeth 18. The seed wheel is secured against a circular supporting disc 21 which is rotatably mounted on a journal pin 20 carried by the seed wheel supporting arm 16. The seed wheel 17 is driven from a drive gear 19 driven from one of the ground engaging wheels 10 and engaging the teeth 18.

Thus it may be seen that as the planter is drawn forwardly, to the right in Figs. 1 and 2, on the wheels 10 the discs 12 will open a furrow for the seeds and the seed wheel will be rotated forwardly through the medium of the gear 19.

The seed wheel 17 is provided with a plurality of seed receiving notches 22 in its periphery. The seeds from the hopper 13 fall into the notches 22 and are carried forwardly and downwardly behind the shoe 14 until they drop from the bottom of the wheel to the ground.

As thus far described, the planter is similar to the planter illustrated in applicant's said patent. This invention relates to a seed ejector, that is a device for forcing the seeds from the seed receiving notches 22, when they reach the bottom of the seed wheel 17.

The objects of the invention are accomplished by forming a hollow rim on the seed wheel 17. The hollow rim is formed by turning an annular indentation into one face of the seed wheel to produce a relatively thin edge portion and extending the indentation toward the edge of the wheel to form an inwardly opening channel 23 in the peripheral edge of the wheel to form a hollow rim thereon. The seed notches 22 open to and extend completely across the hollow channel 23.

An ejector arm 24 is secured to the side of the wheel supporting arm 16 or to any other suitable fixed part of the machine and extends along the side of the seed wheel 17. The arm 24 is bent to conform to the contour of the face of the seed wheel and the extremity is reduced in thickness and rounded to form an ejecting shoe 25 which fits into the channel 23 of the hollow rim and rides in close proximity to the bottom thereof. The seeds in the notches 22 project into the channel 23 so that each seed will strike the shoe 25 and be forced from its notch unless of course it has already fallen therefrom.

In Fig. 5 an alternate form of ejector is illustrated employing the same type of hollow rim seed wheel. In this form a rather heavy wire spring 28 is secured to, and bent around, a spring post 26 carried from a spring arm 27 which may be secured to the wheel arm 16 similarly to the previously described arm 24. The extremity of the wire spring is bent upwardly to form a rounded portion 29, which rides in and bears against the bottom of the channel 23 so as to force each seed from its notch as it passes therebeneath.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. In a seed planter, a circular seed distributing wheel rotatably mounted about a horizontal axis and adapted to have rotary motion imparted to it, the peripheral marginal portion of said wheel having a rim formed with a laterally offset circumferentially extending internal channel, said channel having side walls and an outer marginal wall and being open along its inner margin, said rim being formed with seed-receiving recesses spaced from each other circumferentially of the rim and communicating with the channel through the side walls and the outer marginal wall thereof for the full width of the rim, and an ejector arm free from said wheel and extending along the channeled side of the wheel and having a free end portion fitting into the channel through the open inner peripheral margin thereof and held therein between the side walls of the channel in position for engaging seeds in the recesses and expelling the seeds from the recesses during turning of the wheel.

2. In a seed planter, a circular seed distributing wheel rotatably mounted about a horizontal axis and adapted to have rotary motion imparted to it, the peripheral marginal portion of said wheel having a rim formed with a laterally offset circumferentially extending internal channel, said channel having side walls and an outer marginal wall and being open along its inner margin, said rim being formed with seed-receiving recesses spaced from each other circumferentially of the rim and communicating with the channel through the side walls and the outer marginal wall thereof for the full width of the rim, and an ejector arm free from said wheel and extending along the channeled side of the wheel and provided at its free end with a resilient member fitting into the channel through the open inner margin thereof and confined therein between the side walls and serving to expel seeds outwardly from the recesses as the recesses pass across the resilient member during rotation of the wheel.

PAUL E. MILTON.

REFERENCES CITED

The following references are of record in the file of this patent:

UNITED STATES PATENTS

| Number | Name | Date |
|---|---|---|
| 107,857 | Besler | Oct. 4, 1870 |
| 936,471 | Murphey | Oct. 12, 1909 |
| 969,918 | Streitz | Sept. 13, 1910 |
| 1,955,368 | Hoberg et al. | Apr. 17, 1934 |